United States Patent
Ryan

(10) Patent No.: US 12,081,377 B2
(45) Date of Patent: Sep. 3, 2024

(54) DEMODULATING MODULATED SIGNALS

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/010,432

(22) PCT Filed: Jun. 16, 2021

(86) PCT No.: PCT/EP2021/066302
§ 371 (c)(1),
(2) Date: Dec. 14, 2022

(87) PCT Pub. No.: WO2021/255124
PCT Pub. Date: Dec. 23, 2021

(65) Prior Publication Data
US 2023/0308324 A1 Sep. 28, 2023

(30) Foreign Application Priority Data
Jun. 16, 2020 (GB) ........................ 2009149

(51) Int. Cl.
*H04L 27/144* (2006.01)
(52) U.S. Cl.
CPC ................... *H04L 27/144* (2013.01)
(58) Field of Classification Search
CPC ............... H04L 27/144; H04L 27/2017; H04L 2027/0089; H04L 2027/0095; H04L 27/0014

(Continued)

(56) References Cited

U.S. PATENT DOCUMENTS 5,930,243 A * 7/1999 Parish ................... H04W 16/28
455/562.1
2017/0234985 A1 8/2017 Kadambi et al.
2017/0329743 A1 11/2017 Kim et al.

FOREIGN PATENT DOCUMENTS

CN 105827551 A 8/2016
WO WO 2014/167318 A2 10/2014

(Continued)

OTHER PUBLICATIONS

On the Blind Estimation of the Parameters of Continuous Phase Modulated Signals, IEEE Journal on Selected Areas in Communications, vol. 23, No. 5, p. 944-965 (Year: 2005).*

(Continued)

*Primary Examiner* — Tanmay K Shah
(74) *Attorney, Agent, or Firm* — Klarquist Sparkman, LLP

(57) ABSTRACT

An apparatus for demodulating a frequency-modulated signal comprises a joint frequency-offset & modulation-index estimator, and a signal demodulator. The joint estimator receives data representative of a preamble portion of the signal, modulated with predetermined preamble data. It jointly determines a frequency-offset estimate and a modulation-index estimate by using an optimization process that minimizes a cost function that is a function of the received data and that is parameterised by a frequency-offset parameter and by a modulation-index parameter. The signal demodulator receives data representative of a message portion of the signal, modulated with message data, and uses the frequency-offset estimate to demodulate the message.

20 Claims, 3 Drawing Sheets

(58) Field of Classification Search
USPC .......................................................... 375/334
See application file for complete search history.

(56) References Cited

FOREIGN PATENT DOCUMENTS

| WO | WO 2017/103557 A1 | 6/2017 |
|---|---|---|
| WO | WO 2019/134947 A2 | 7/2019 |
| WO | WO 2019/207009 A1 | 10/2019 |
| WO | WO 2021/255108 A1 | 12/2021 |

OTHER PUBLICATIONS

Bianchi et al., "On the Blind Estimation of the Parameters of Continuous Phase Modulated Signals," *IEEE Journal on Selected Areas in Communications*, vol. 23, No. 5, May 2005, pp. 944-962.

Conway et al., "Fast Quantizing and Decoding Algorithms for Lattice Quantizers and Codes," *IEEE Transaction on Information Theory*, vol. IT-28, No. 2, Mar. 1982, pp. 227-232.

Damen et al., "On Maximum Likelihood Detection and the Search for the Closest Lattice Point," *IEEE Transactions on Information Theory*, vol. 49, No. X, 2003, 13 pages.

International Search Report and Written Opinion for PCT/EP2021/066269, mailed Aug. 18, 2021, 13 pages.

International Search Report and Written Opinion for PCT/EP2021/066302, mailed Aug. 18, 2021, 13 pages.

IPO Search Report under Section 17(5) for GB2009141.9, mailed Mar. 3, 2021, 3 pages.

IPO Search Report under Section 17(5) for GB2009149.2, mailed Mar. 5, 2021, 3 pages.

Jain, "Noncoherent Sequence Detection Receiver for Bluetooth Systems," *Thesis*, Sep. 2004, 116 pages.

Kay, "A Fast and Accurate Single Frequency Estimator," *IEEE Transactions on Acoustics, Speech, and Signal Processing*, vol. 37, No. 12, Dec. 1989, pp. 1987-1990.

McKilliam et al., "A linear-time nearest point algorithm for the lattice An*," *2008 International Symposium on Information Theory and its Applications*, Dec. 2008, pp. 1-5.

McKilliam et al., "An Algorithm to Compute the Nearest Point in the Lattice An*," *IEEE Transactions on Information Theory*, vol. 54, No. 9, Sep. 2008, pp. 4378-4381, arXiv:0801.1364 [cs.IT].

McKilliam et al., "Frequency Estimation by Phase Unwrapping," *IEEE Transactions on Signal Processing*, vol. 58, No. 6, Jun. 2010, pp. 2953-2963.

Meyr et al., "Digital Communication Receivers—Synchronization, Channel Estimation, and Signal Processing," *John Wiley & Sons, Inc.*, 1998, pp. 478-490.

Tibenderana et al., "Efficient and Robust Detection of GFSK Signals under Dispersive Channel, Modulation Index, and Carrier Frequency Offset Conditions," *EURASIP Journal on Applied Signal Processing*, 2005, pp. 2719-2729.

Vaughan et al., "An Algorithm to Compute a nearest Point in the Lattice An*," In: Fossorier, M., Imai, H., Lin, S., Poli, A. (eds) Applied Algebra, Algebraic Algorithms and Error-Correcting Codes. AAECC 1999. *Lecture Notes in Computer Science*, vol. 1719. Springer, Berlin, Heidelberg, pp. 104-108.

Xu et al., "Robust phase unwrapping algorithm," *Electronics Letters*, vol. 49, No. 24, Nov. 1, 2013, pp. 1565-1567.

Official Action Report, Chinese Application No. 202180050242.X, 7 pages, Jun. 22, 2024.

\* cited by examiner

DEMODULATING MODULATED SIGNALS

CROSS REFERENCE TO RELATED APPLICATIONS

This is the U.S. National Stage of International Application No. PCT/EP2021/066302, filed Jun. 16, 2021, which was published in English under PCT Article 21(2), which in turn claims the benefit of Great Britain Application No. 2009149.2, filed Jun. 16, 2020.

BACKGROUND OF THE INVENTION

This invention relates to methods and apparatus for demodulating modulated signals.

Transmissions systems are known for transmitting signals from a transmitter to a receiver. In some systems, digital message data is modulated on a frequency- or phase-modulated carrier signal. Examples include Bluetooth™ and Bluetooth Low Energy (BLE)™, which use Gaussian FSK (GFSK) modulation. In binary frequency-shift key (FSK) modulation, data is encoded by the transmitter transmitting one of two different frequencies, offset either side of a carrier frequency. The modulation may be applied so that the phase of the transmitted signal is continuous using continuous-phase FSK (CP-FSK). GFSK is a type of CP-FSK in which spectral leakage is reduced by Gaussian shaping of the modulating data signal.

Receivers can use coherent detection, in which the receiver uses knowledge of the phase of the carrier to demodulate the signals, or non-coherent detection in which a phase reference is not used. A known approach for non-coherently demodulating a signal is to use a matched filter bank (MFB), which cross-correlates the incoming sampled signal with a bank of predetermined filter sequences, representing respective waveforms corresponding to different modulated data, in order to determine the most likely symbol sequence that is communicated by a particular portion of the incoming signal.

If a reference clock used by the receiver is not locked to a reference clock of the transmitter, there is the potential for a frequency mismatch, or offset, to be present. Such a frequency offset can result in the receiver inaccurately demodulating modulated message data, such as frequency- or phase-modulated data.

It is known to provide a predetermined, known preamble or training sequence in an incoming data packet (typically located at or towards the beginning of the packet), which the receiver can process to determine a frequency-offset estimate. The receiver can then use this frequency-offset estimate to apply appropriate compensation to later-received samples—e.g. by rotating the complex samples through a suitable phase angle—to enable more accurate demodulation of unknown message data from the data packet.

Various approaches to estimating the carrier frequency are known. For example, the applicant's earlier patent application WO 2014/167318 describes using a correlator to determine both timing information and a carrier frequency offset, while the paper "Frequency Estimation by Phase Unwrapping" by McKilliam et al., IEEE Transactions on Signal Processing, vol. 58, no. 6, pp. 2953-2963, 2010, proposes performing frequency estimation of a single carrier frequency using phase unwrapping and a nearest-point lattice search.

However, the applicant has determined that the accuracy of known approaches can suffer in some situations. The present invention therefore seeks to provide an alternative approach to demodulating a modulated signal.

SUMMARY OF THE INVENTION

From a first aspect, the invention provides a method of demodulating a modulated signal, the method comprising:
  receiving data representative of a preamble portion of the modulated signal, wherein the preamble portion is modulated with predetermined preamble data;
  jointly determining a frequency-offset estimate and a modulation-index estimate by using the received data to perform an optimization process, wherein the optimization process minimizes a cost function that is a function of the received data and that is parameterised by a frequency-offset parameter and by a modulation-index parameter;
  receiving data representative of a message portion of the modulated signal, wherein the message portion is modulated with message data; and
  using the frequency-offset estimate when demodulating the message portion.

From a second aspect, the invention provides an apparatus for demodulating a modulated signal, the apparatus comprising:
  a joint frequency-offset and modulation-index estimator; and
  a signal demodulator,
wherein the joint frequency-offset and modulation-index estimator is configured to:
  receive data representative of a preamble portion of the modulated signal, wherein the preamble portion is modulated with predetermined preamble data; and
  jointly determine a frequency-offset estimate and a modulation-index estimate by using the received data to perform an optimization process, wherein the optimization process minimizes a cost function that is a function of the received data and that is parameterised by a frequency-offset parameter and by a modulation-index parameter,
and wherein the signal demodulator is configured to:
  receive data representative of a message portion of the modulated signal, wherein the message portion is modulated with message data; and
  use the frequency-offset estimate to demodulate the message.

Thus it will be seen that, in accordance with the invention, the same optimization process can be used to estimate both the frequency offset and the modulation index (i.e. the frequency spread divided by the symbol rate) of the signal by minimizing a cost function of the received data. This not only results in an estimate of the modulation index-which may be useful for accurately demodulating the message—but it can also improve the accuracy of the frequency offset estimate, e.g. in situations where the modulation index used by the transmitter deviates from the modulation index expected by the receiver. This situation can often arise in practice, e.g. due to manufacturing tolerances and/or temperature-related effects in the transmitter. Having an accurate estimate of the modulation index used by a transmitter can also improve the sensitivity of a receiver by preventing phase errors accumulating over time.

If a receiver uses an incorrect frequency offset estimate and/or incorrect modulation index value, this can significantly affect the accuracy of the demodulation, especially for high-performance detectors which observe multiple symbols simultaneously, such as a matched filter bank (MFB) that outputs soft bits to decision logic such as a Viterbi decoder.

The present approach may, at least in some embodiments, enable the receiver to receive signals over a wider frequency tuning range compared with known approaches that estimate frequency independently of modulation index, such as the correlator-based approach disclosed WO 2014/167318 which has a frequency range, $\Delta f$, that is limited by the selected autocorrelation delay, D, such that max $|\Delta f|<1/(2D)$.

It may, in some embodiments, allow the same single apparatus to be able to detect signals modulated with various different types of modulation—e.g. able to detect BLE packets, having a modulation index in the range 0.45-0.55; Bluetooth™ Basic Rate/Enhanced Data Rate GFSK-modulated packets, having a modulation index in the range 0.28-0.35; and IEEE 802.15.4 OQPSK-modulated packets (equivalent to MSK with a modulation index of 0.5). This can be possible because the apparatus may only need to know the symbol timing offset and symbol rate in order to estimate the frequency offset and modulation index.

In some embodiments, the modulation-index estimate may be determined as an offset from a predetermined value—e.g. as an offset from 0.5 or 0.45. The modulation-index parameter may be a modulation-index offset parameter.

The modulation-index estimate may be used, in addition to the frequency-offset estimate, when demodulating the message.

The modulated signal may be modulated using any modulation. It may be a phase-modulated signal (with or without amplitude modulation—e.g. PSK or QAM modulated). However, in preferred embodiments the signal is a frequency-modulated signal. It may be modulated with varying amplitude; however, in preferred embodiments it is modulated using a constant-amplitude modulation. A constant amplitude is more typical of frequency-modulated signals rather than phase-modulated signals. The estimation process may be particularly effective for constant-amplitude signals, because limited information is lost when converting such signals to the phase domain. The modulated signal may be a frequency-shift-key (FSK) modulated signal. It may be a binary-FSK signal. It may be a CP-FSK signal. It may be a GFSK signal.

The data representative of the preamble portion may comprise a sequence of complex sample values. The optimization process may determine phase information from the data representative of the preamble portion. The optimization process may determine the phase angle of each complex sample value. The optimisation process may determine an optimal unwrapping of the phases of the complex sample values.

The apparatus may be configured to process the data representative of the preamble portion in the phase domain. It may be configured to generate phase-domain data representative of the preamble portion from time-domain data representative of the preamble portion.

The cost function may additionally be parameterised by a phase-unwrapping parameter. In some embodiments, the optimization process may minimize the cost function over the phase-unwrapping parameter.

The cost function may be a least-squares cost function. The optimization process may be arranged to find a solution to a least-squares minimization problem.

The apparatus may be configured to store or access data relating to the predetermined preamble data. The data may relate to an expected preamble portion of a modulated signal—e.g. a signal transmitted by a transmitter apparatus. The data may be stored in a memory of the apparatus before the modulated signal is received by the apparatus. The apparatus may use this stored data when performing the optimization process. The cost function may be a function of the stored data. The stored data may represent phase information of a signal modulated with the predetermined preamble data. It may comprise a sequence, of a function of a sequence, of accumulated phase offsets for such a signal—e.g. representing accumulated phase offsets at regular sample intervals over a preamble portion when the preamble data is modulated on a carrier signal. The stored data may encode a matrix that is a function of a vector of accumulated phase-offset values for the predetermined preamble data. The matrix may be a function of one or more matrices wherein at least one of the matrices has a row or column containing a series of accumulated phase-offset values that are dependent on the predetermined preamble data.

In some embodiments, one or both of the frequency-offset parameter and the modulation-index parameter may be kept constant during some or all of the optimization process. The frequency-offset and/or modulation-index parameter that has been held constant may then be determined by back-substitution, e.g. after the optimization process has determined an optimal value for the phase-unwrapping parameter.

In a first set of embodiments, the frequency-offset estimate and the modulation-index estimate are determined by performing the optimization process with the frequency-offset parameter set to a first constant value (e.g. zero) and with the modulation-index parameter set to a second constant value (e.g. 0.5, or a zero offset). The frequency-offset and modulation-index estimates may then be determined by back-substitution.

In a second set of embodiments, the joint frequency-offset and modulation-index estimator comprises a frequency estimator, which may be a low-complexity, coarse frequency estimator. The frequency estimator may be used to determine a first estimate of the frequency offset. The apparatus may be configured to use the first estimate to apply frequency-offset compensation to the data representative of the preamble portion—e.g. by rotating complex samples in the data. The optimization process may then be performed with the frequency-offset parameter set to zero; the modulation-index parameter may be set to a second constant value (e.g. 0.5, or a zero offset). Alternatively, the optimization process may be performed with the frequency-offset parameter set to the first estimate; the modulation-index parameter may be set to a second constant value (e.g. 0.5, or a zero offset). In both cases, the (final) frequency-offset estimate and the modulation-index estimate may then be determined by back-substitution.

In a third set of embodiments, the frequency-offset estimate and the modulation-index estimate are determined by performing the optimization process a plurality of times, with the frequency-offset parameter and the modulation-index parameter set to a different respective tuple (pairs of values) each time. The optimization process may be performed for each tuple in a predetermined set of tuples. The joint estimator may access a memory in which the set of tuples is stored. The tuples may cover a rectangular grid. The frequency-offset estimate and the modulation-index estimate may be determined in dependence on the tuple which resulted in a most optimal solution to the optimization process—i.e. a lowest minimum cost value.

In some embodiments, the joint frequency-offset and modulation-index estimator may be configured to perform the back-substitution using one-dimensional vector operations; it may perform the back-substitution without performing any matrix inversion operation. This can reduce complexity and improve numerical stability.

The optimization process may be configured to minimize the cost function by identifying a closest point in a lattice. It may implement a closest lattice point search. It may be configured to search for a closest point over the lattice $A_n^*$, where n may be two, or where n may be any other value. It may be configured to perform a closest lattice point search using an algorithm having O(N) complexity. This can result in a particularly efficient implementation.

In some embodiments, the receiver may be configured for receiving a modulated signal (e.g. an FSK-modulated signal) having a predetermined modulation index, known to the receiver, and the methods disclosed herein may then be used to adjust for tolerances in the transmitter. However, the methods disclosed herein may advantageously enable a receiver to successfully demodulate a signal of unknown modulation index.

The message portion may be demodulated using any appropriate technique.

The data representative of the received modulated signal may comprise a sequence of sample values, which may be complex values. The data representative of the preamble portion and/or the message portion may be stored in a memory (e.g. RAM) or in registers. The samples may be at baseband. The apparatus may comprise an analogue-to-digital converter (ADC) for sampling the received modulated signal. It may comprise an analogue or digital mixer for down-mixing the received signal—e.g. to baseband.

The signal may be received by the apparatus—e.g. from a separate transmitter apparatus, over a wired or wireless channel. It may be received at an antenna of the apparatus. The apparatus may comprise a radio receiver for receiving the modulated radio signal and for generating the data representative of the preamble and message portions (e.g. by complex downmixing and sampling of the received signal). Methods disclosed herein may comprise receiving the modulated signal. The received modulated signal may be a radio signal. It may be modulated around a carrier frequency, e.g. around 2.4 GHz. It may be a Bluetooth™ or BLE signal.

The apparatus may be or comprise a radio receiver or transceiver. The apparatus may comprise one or more of: an antenna; a low-noise amplifier; an ADC; a local oscillator; and a mixer. The apparatus may comprise a processor and a memory for storing software instructions for execution by the processor. The joint frequency-offset and modulation-index estimator may be implemented wholly or partly in software, but in one set of embodiments it is a dedicated hardware circuit, distinct from the processor. Similarly, the signal demodulator may be at least partly implemented in software, but in one set of embodiments it is implemented as a dedicated hardware circuit.

In some embodiments, the apparatus may be configured for demodulating signals modulated with a plurality of different modulation types—e.g. FSK-modulated signals having different transmission modulation-index ranges; or both frequency-modulated and phase-modulated signals.

The signal may encode part or all of a data packet—e.g. a BLE baseband packet. The preamble portion may be at or near the beginning of the signal. The preamble data may comprise part or all of a predetermined synchronization sequence (e.g. part or all of a BLE Access Code or Sync Word). It may additionally or alternatively comprise part or all of a device or connection identifier, such as a receiver address field or a link-layer connection identifier.

The signal demodulator may comprise a matched filter bank (MFB) for demodulating the message portion. The MFB may be distinct from the joint frequency-offset and modulation-index estimator. It may comprise a bank of correlators configured to cross-correlate some or all of the message-portion data against respective filters. Each filter may be determined at least in part by a set of filter coefficients, which may be stored in registers of the signal demodulator. Data representative of the modulation-index estimate may be output by the joint frequency-offset and modulation-index estimator and may be used to determine what filter coefficients are used by the signal demodulator.

The signal demodulator may comprise a frequency-correction circuit which may be configured to apply a rotation operation to at least a portion of the data representative of the received modulated signal. The frequency-correction circuit may comprise one or more CORDICs. The rotation may depend, at least in part, on the frequency-offset estimate, which the frequency-correction circuit may be arranged to receive from the joint frequency-offset and modulation-index estimator. Rotated data output by the frequency-correction circuit may, in some embodiments, be received by the MFB.

The apparatus may comprise a frequency estimator, distinct from the joint frequency-offset and modulation-index estimator, which may be configured to generate a succession of further frequency-offset estimates by processing the data representative of the message portion. These may be used when demodulating the message portion. They may refine or supersede the preamble-based frequency-offset estimate determined by the joint frequency-offset and modulation-index estimator.

The signal demodulator may comprise decision circuitry for demodulating the received modulated signal. The decision circuitry may receive correlation-coefficient data from an MFB. It may comprise majority-vote logic, or any other appropriate demodulating and/or decoding logic. It may comprise a Viterbi decoder.

The apparatus may comprise a memory for storing the demodulated message portion. It may further process the demodulated signal, e.g. to decode the message data from the message portion. In some situations, the received signal may control an operation of the apparatus, such as causing the apparatus to display information on a display screen, or control a peripheral.

The apparatus may be or comprise an integrated-circuit device—e.g., a silicon chip. The joint frequency-offset and modulation-index estimator and the signal demodulator may be integrated on a system-on-chip device. The apparatus may comprise any one or more of: a power supply, an antenna, a crystal, discrete capacitors, discrete resistors, etc. The apparatus may comprise a digital radio receiver or transceiver. It may comprise one or more processors, DSPs, logic gates, amplifiers, filters, digital components, analogue components, non-volatile memories (e.g., for storing software instructions), volatile memories, memory buses, peripherals, inputs, outputs, and any other relevant electronic components or features.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
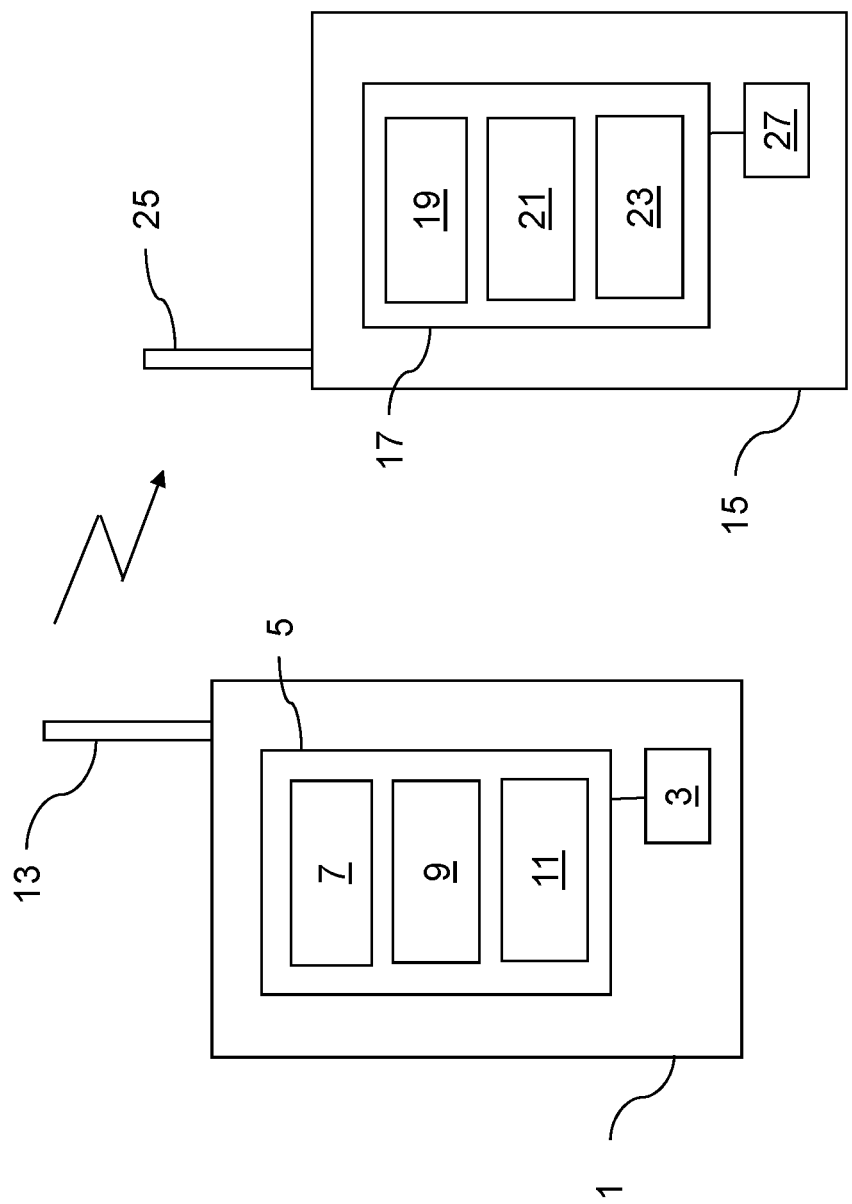
FIG. 1 is a schematic drawing of a radio communication system including a radio receiver embodying the invention.

FIG. 1 shows a radio transmitter device 1 which is in communication with a radio receiver device 15. The radio receiver device 15 embodies the present invention.

The radio transmitter device 1 has a sensor 3 (e.g. a temperature sensor) which is connected to a system-on-chip (SoC) 5. The SoC 5 comprises radio transceiver circuitry 7 and a microprocessor 9, such as an ARM™ Cortex M-series processor, for executing software stored in a memory 11. The device 1 may also contain other components, such as a battery, crystal oscillator, discrete components, etc., which are omitted from the FIG. 1 for simplicity. The radio transceiver circuitry 7 is connected to a radio antenna 13, for transmitting and receiving radio signals.

The radio receiver device 15 has a system-on-chip (SoC) 17, comprising radio transceiver circuitry 19, a microprocessor 21, such as an ARM™ Cortex M-series processor, and a memory 23 for storing software to be executed by the microprocessor 21. The radio transceiver circuitry 19 is connected to an antenna 25 for receiving and transmitting radio signals. The SoC 17 is connected to an output peripheral 27, such as a display screen, for outputting a response which may be based, at least in part, on data received by the radio transceiver circuitry 19 through the antenna 25. The receiver device 15 may contain other components (not shown), such as a battery, crystal oscillator, discrete components, further microprocessors, etc.

In use, the radio transmitter device 1 transmits data packets from the antenna 13, modulated on a radio-frequency carrier (e.g. at around 2.4 GHz), using two-level GFSK with a modulation index h. (The modulation index h is the difference between the two frequencies in the two-level FSK signal, divided by the bitrate of the encoded data stream.) The data packet comprises a predetermined synchronization sequence and a message-data portion. It may also include one or more of address data, a link-layer identifier, packet-length data, and any other appropriate elements. A preamble portion of the packet, for the purposes of the cross-correlations described below, may comprise some or all of the synchronization sequence and/or some or all of the address or link-layer data. The radio receiver device 15 is configured to receive, demodulate (i.e. detect) and decode such data packets. It may also transmit similar data packets. The data packets may comply with some or all parts of a version of the Bluetooth Low Energy (BLE)™ core specification, e.g. Bluetooth™ 5. The radio receiver device 15 may be a BLE receiver.

The radio transceiver circuitry 19 in the radio receiver device 15 uses a matched filter bank (MFB) to implement non-coherent detection (i.e. non-coherent demodulation) of incoming data. The MFB may observe a number, K, of bits at a time. This observation interval could be K=3, 5 or 7 bits long, or any other suitable length.

The radio transceiver circuitry 19 uses a clock reference (e.g. derived from a quartz crystal in the receiver device 15) to demodulate incoming signals. This clock reference is intended to match a clock reference used by the transceiver circuitry 7 in the transmitter device 1. However, there will typically some mismatch in these clock references, resulting in a frequency offset between an expected frequency of the incoming signal received at the antenna 25 of the receiver device 15 and the actual incoming frequency. This offset may change during the transmission of a data packet—e.g. due to clock drift at the transmitter 1 or receiver 15, or due to changing channel conditions such as relative motion between the transmitter 1 and the receiver (e.g. Doppler shift).

The receiver device 15 can determine an preamble-based frequency offset estimate, as described in more detail below. It can also periodically generate updated estimates of the frequency offset, while receiving message data, in order to improve the accuracy of the demodulation.

The modulation index h is the difference between the two FSK frequencies, divided by the bitrate of the encoded data stream. In order to demodulate a received data packet accurately, the receiver 15 needs to have an accurate estimate of the modulation index used by the transmitter 1. However, the exact modulation index may not be known to the receiver 15. In some situations, the transmitter 1 may be able to use any modulation index within a range of values—e.g. in the range [0.45, 0.55]. The modulation index it uses may also change over time.

If the receiver 15 does not have an accurate estimate h of the actual modulation index h, the sensitivity of the receiver 15 can be reduced. This is because a phase error can accumulate over an observation interval, thereby affecting detector performance. If $\hat{h}$ is inaccurate by 0.05, for example, this can result in a potential phase offset in the received signal of $+/-0.05 \cdot K \cdot \pi$, which equals $\pi/4$ for K=5. For a K=5 detector, the performance loss may be of the order of 0.7 dB loss for BLE at 1 Mbps data rate, and may be even greater for some other radio protocols.

This problem is mitigated in embodiments described herein, in which the receiver 15 uses a novel approach to jointly estimate a modulation index offset and a frequency offset. The estimated modulation index may then be used to improve the accuracy of the demodulation of later parts of the received signal—e.g. by adjusting the coefficients in the MFB 37 according to the estimated modulation index.

Figure 2:
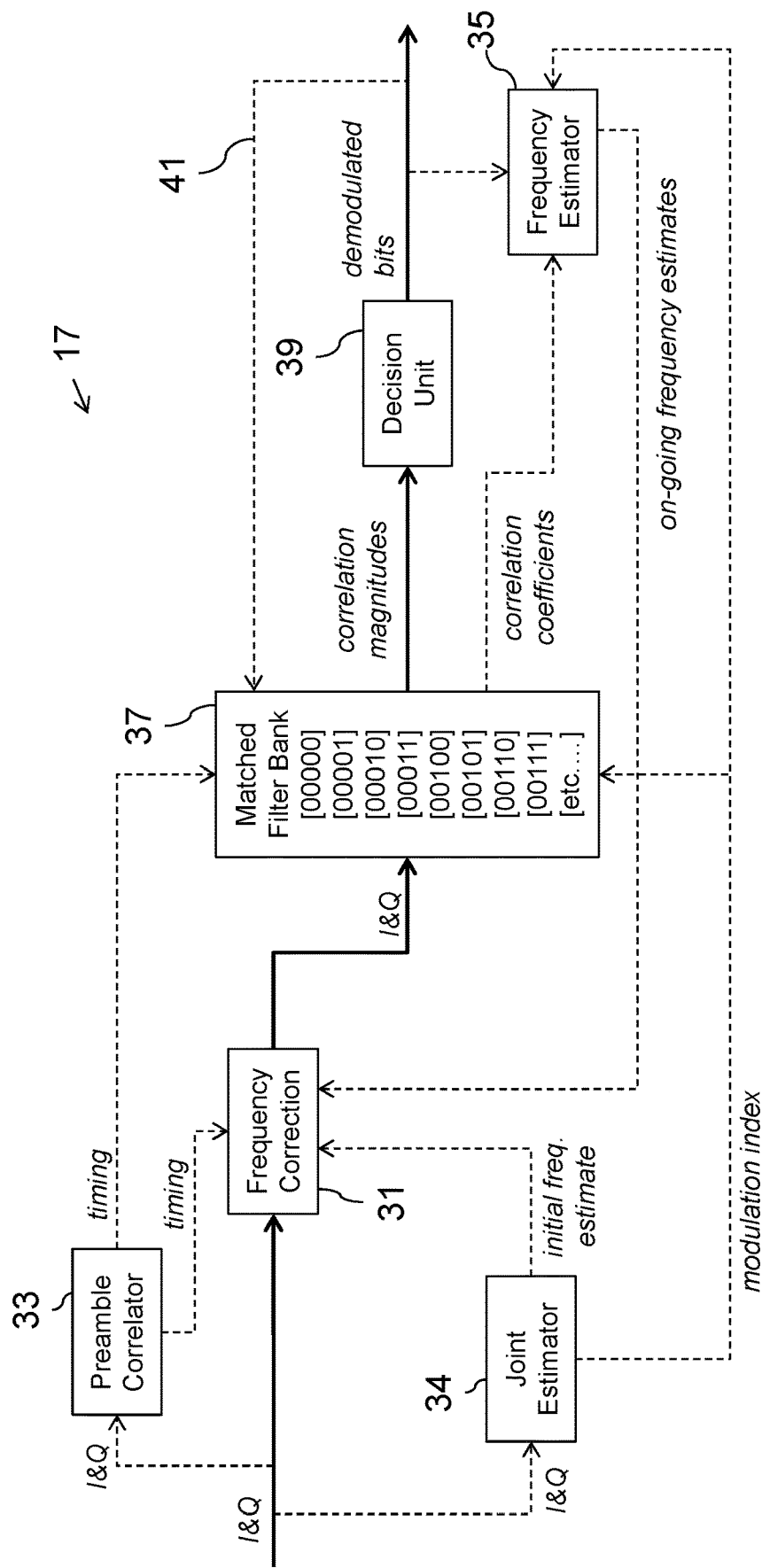
FIG. 2 is a schematic drawing of functional units within the receiver circuitry of the radio receiver of FIG. 1.

FIG. 2 shows various functional blocks provided by the system-on-chip (SoC) 17 that are used in demodulating an incoming two-level CP-FSK encoded radio signal. In other embodiments, different types of modulation may be used. Each of these blocks may be implemented using dedicated circuitry in the radio transceiver circuitry 19—e.g. as blocks comprising application-specific registers and logic gates. However, in some embodiments, one or more operations of one or more blocks may be implemented by software, e.g. executing on the microprocessor 21. A pure software implementation is possible, but may be undesirable for performance reasons.

The radio transceiver circuitry 19 may use any combination of amplifiers, mixers, filters, analogue-to-digital converters, etc. to generate a sampled radio signal, from a received analogue radio signal, comprising a sequence of complex-valued digital samples, I & Q, at baseband. These samples represent the radio signals received around a particular carrier frequency—e.g. in a band within the 2.4 GHz spectrum. The signal may be oversampled by a factor R. In some examples, R=8, although it could take any suitable value.

The principal signal path for payload message data, through the components of FIG. 2, is shown using solid arrows, while control, calibration and feedback paths are shown using dashed arrows.

The stream of complex baseband samples is input to each of a frequency correction block 31, a preamble correlator 33, and a joint frequency-offset and modulation index estimator 34 (also referred to herein as a "joint estimator" for short).

The preamble correlator 33 detects the presence of a relevant data packet. The preamble correlator 33 performs timing recovery and frame synchronization, to enable the receiver 15 to demodulate the signal more accurately. It does this by cross-correlating the incoming samples against a stored template. The template comprises a sequence of (complex) coefficients that represents the modulated baseband waveform of a fixed preamble that is included in each data packet intended for the receiver 15.

The preamble may comprise part or all of a constant synchronization sequence that is present in every data packet within the system, and/or part or all of an address of the receiver 15 and/or part or all of a channel or link identifier and/or any other appropriate data. When receiving BLE data packets, the preamble correlator 33 may, for example, use 16-bit preamble sequences, consisting of the last two bits of the BLE Preamble field and the first fourteen bits of the Address field. The preamble used by the correlator may, at least for some packets, precede message data encoded in the data packet.

Symbol and frame (i.e. packet) timing information determined by the preamble correlator 33 is output to the frequency correction block 31, as well as to other modules that require it. The frequency correction block 31 performs complex rotation of the samples to compensate for any frequency offset, based on frequency-offset estimate information received from the joint estimator 34, and also received from a separate frequency offset estimator 35. The frequency correction block 31 may comprise one or more CORDIC circuits for performing the complex rotation.

The joint estimator 34 is described in greater detail below. It uses the fixed preamble to generate a preamble-based frequency offset estimate (e.g. arising from an offset between an oscillator of the receiver 15 and an oscillator of the transmitter 1) and a modulation index estimate. The modulation index estimate may be expressed as an offset from a nominal modulation index expected by the receiver—e.g. as an offset from $h_0=0.5$. The preamble-based frequency offset estimate may be subsequently refined or superseded by the output of the frequency estimator 35 which determines further frequency offset estimates periodically, as the payload message data portion of the data packet is demodulated.

The joint estimator 34 provides the modulation index to a matched filter bank (MFB) 37, where it is used to adjust the correlation coefficients, and to the frequency estimator 35. The matched filter bank (MFB) 37 and the frequency estimator 35 also receive timing information from the preamble correlator 33.

The matched filter bank 37 receives the stream of frequency-corrected samples from the frequency correction block 31. It applies a set of filters, each K bits long, to the incoming samples. In FIG. 2, K=5, but K could be 3, 4, 7, 11 or any other length. Each filter of the MFB 37 performs a complex cross-correlation between the sampled signal and a respective filter sequence of coefficients that represents a baseband waveform modulated according to a respective bit pattern. The MFB 37 uses the modulation index estimate, $\hat{h}_{TX}$, received from the joint estimator 34 to select appropriate filter sequence coefficients.

At each time step, the matched filter bank 37 generates a set of $2^K$ complex correlation coefficients, one for each filter in the selected set, representing the degree of correlation between a window of the incoming samples and the respective template. The MFB 37 computes a real-valued modulus of each coefficient and outputs these as a set of $2^K$ correlation strength values to a decision unit 39. In some embodiments, the MFB 37 may be implemented similarly to the MFB disclosed in the applicant's earlier application WO 2019/134947, the entire contents of which are hereby incorporated by reference, with the modulation index h being determined from the estimate output by the joint estimator 34.

The decision unit 39 receives this correlation-strength data and processes it to generate a sequence of detected hard bits (i.e. 0 or 1 values). This processing may be similar or the same as that described for the decision unit in the applicant's earlier application WO 2019/207009, the entire contents of which are hereby incorporated by reference. In other embodiments, the MFB output may be processed using majority voting principles as disclosed in WO 2014/167318. In some embodiments, the decision unit 39 may comprise a Viterbi decoder. The decision unit 39 outputs a demodulated bit value at each bit period. The value of each demodulated bit may be determined from the outputs of the MFB 37 at K different symbol (bit) periods, since the same bit position is considered K times at K different bit positions within the filter sequences.

In some embodiments, the detected bits are fed back to the MFB 37 along a feedback path 41. In such embodiments, these bits may be used by the MFB 37 to help refine the filter sequences that the MFB 37 cross-correlates with the received samples—e.g. as described in WO 2019/207009.

The complex correlation coefficients from the matched filter bank 37 are also sent to the frequency estimator 35, while the data packet is demodulated. The frequency estimator 35 uses them to detect on-going frequency drift, subsequent to the preamble-based frequency offset estimated by the joint estimator 34. Such drift, if not corrected for, may negatively impact the performance of the demodulation. Estimates of frequency drift are used to send control signals to the frequency correction block 31.

The demodulated bit stream, output by the decision unit 39, may be stored in the memory 23 and/or may be processed further by the radio receiver 15 or by some other device, as appropriate. It may, in some applications, determine an output from the peripheral 27—e.g. decoded data from a variable message portion of a data packet may control what is displayed on a display screen of the receiver device 15.

Figure 3:
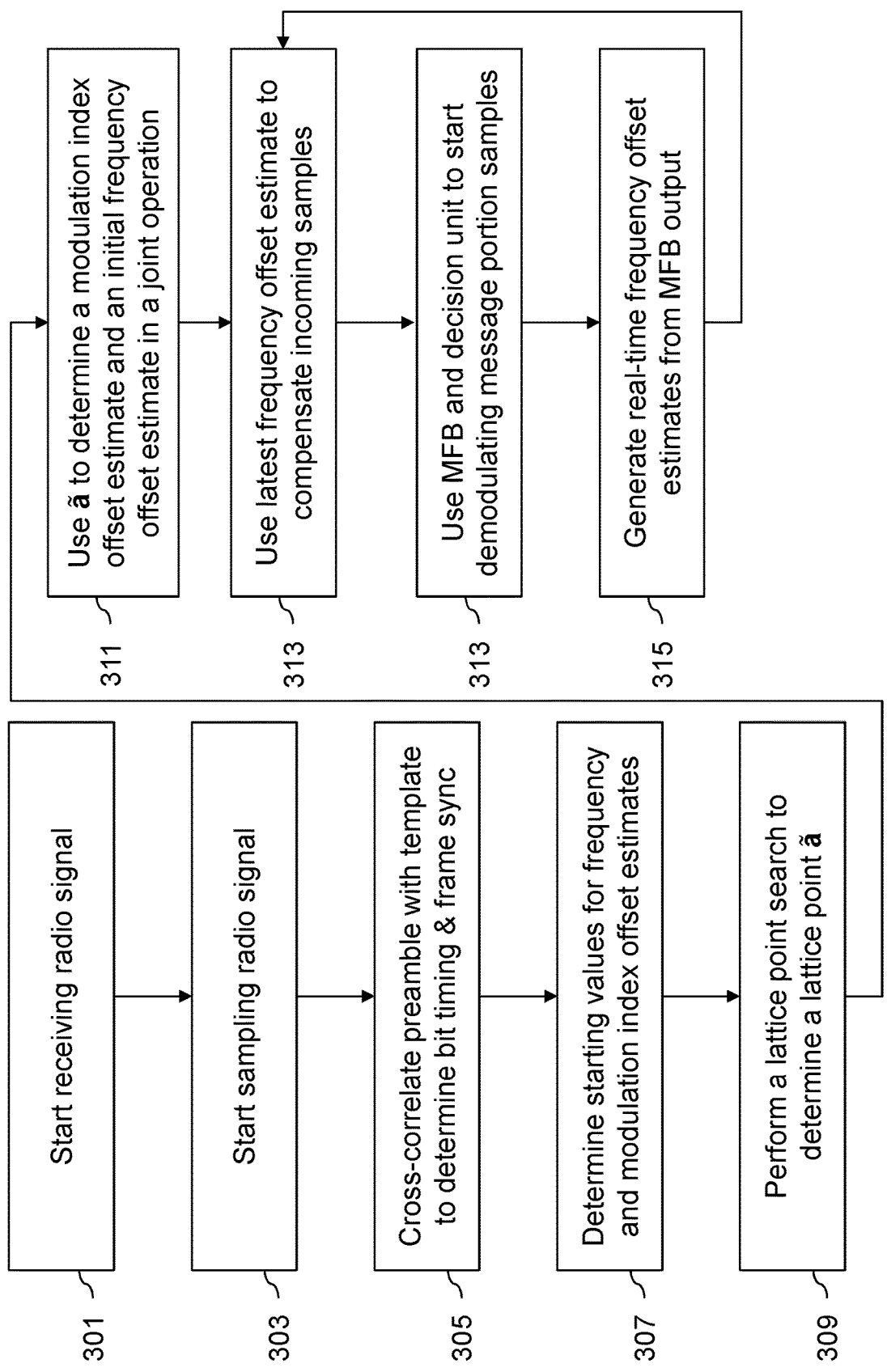
FIG. 3 is a flow chart of operations performed by the receiver circuitry of the radio receiver of FIG. 1.

FIG. 3 is a flow chart which summarises some of the key operations that are performed by the SoC 17 when demodulating a data packet, with a focus on the novel joint frequency offset and modulation index estimation process.

A physical radio signal is received 301 and sampled 303. Earlier samples are processed as later samples are still being received. The incoming samples are cross-correlated 305 with a set of one or more templates by the preamble correlator 33 to detect a preamble portion of the received packet, and to determine bit-level and frame-level synchronization.

The joint estimator 34 determines 307 initial values for estimates of the frequency offset and of the modulation index offset (i.e. as an offset from a preconfigured default modulation index value). In some embodiments, these initial offset value are simply both set to zero; in other embodiments, a plurality of different values are used; while in further embodiments, the modulation index offset is set to zero and a correlator is used to determine a crude frequency offset estimate, which may determine an initial frequency offset value or which may be used to perform an initial rotation of the incoming samples.

The initial offset values are then used by the joint estimator 34 to jointly determine 311 a modulation index offset estimate and a preamble-based frequency offset estimate by solving one or more least-squares minimization problems, holding the initial offset values as constants. The minimization process is implemented in the joint estimator 34 as a lattice point search.

The frequency correction block 31 uses the preamble-based (and any subsequent) frequency offset estimate to apply 313 frequency correction by rotating the incoming samples by a corresponding amount, to compensate for the frequency offset.

The MFB 37 is used, in conjunction with decision circuitry 39, to demodulate 313 a message portion of the data packet. The frequency offset estimator 35 calculates 315 updated estimates of the frequency offset based on the output of the MFB 37 as the message portion is decoded. These are fed back to the frequency correction block 31 which uses the updated estimates to apply 313 frequency correction to subsequent incoming samples.

The process is repeated at every incoming sample until the end of the data packet.

More details of the operation and implementation of the joint estimator 34 are provided below.

System Model

A frequency shift keying (FSK) signal with modulation index h and oversampling ratio R, can be defined as $$x_{nR+r} = x_{nR} \exp\left\{ j\pi h \beta_n \frac{r}{R} \right\} \quad (1)$$

$$= \sqrt{P_x} \exp\left\{ j\pi h \left( \beta_k \frac{r}{R} + \sum_{l=1}^{n-1} \beta_l \right) \right\} \quad (2)$$

where:
- $x_k$ is the transmitted signal at sample time k=nR+r,
- n is the number of bits that have been sent within a data packet;
- r ∈ [0, R−1] indexes the samples within each bit;
- $j=\sqrt{-1}$;
- h is the modulation index;
- $\beta_n = 2 \cdot b_n - 1$ is the sign of the instantaneous phase shift corresponding to bit $b_n$ which is the nth bit of the data packet (i.e. with values in {−1, 1}, instead of {0, 1}); and
- $P_x$ is the power at $x_0$.

The summand inside the exponential represents the accumulated phase offset of all the bits leading up to the current bit, accumulated over the whole stream thus far—i.e. from the first bit (l=0) of the data packet up to and including the bit (l=n−1) that immediately precedes the current bit (n).

In some cases, the transmitted signal may employ pulse-shaping, such as Gaussian filtering. In such cases this model is only approximate; however, it can still be possible for the coefficients of the MFB 37 to be based on this model and successfully demodulate such a signal.

The received signal is given by $$y_{nR+r} = x_{nR+r} \exp\left\{ j\left(\theta + 2\pi \Delta_f\left(n + \frac{r}{R}\right)\right)\right\} + v_{nR+r} \quad (3)$$

where:
- $y_k$ is the received signal at sample time k=nR+r,
- $x_k$ is the transmitted signal at sample time k=nR+r,
- θ is a constant phase offset due to the channel;
- $\Delta_f$ is a constant frequency offset between the transmitter 1 and the receiver 15; and
- $v_k$ is zero-mean complex additive white complex Gaussian noise (AWGN).

The MFB 37 demodulates data from such a received signal by non-coherently correlating the sampled radio signal with $2^K$ filters that have coefficients corresponding to the modulated signal for all possible K-bit sequences.

The following definition, representing the accumulated phase over the transmitted data packet up to a sample nR+r, will be useful in the explanation below:

$$s_{nR+r} \triangleq \beta_k \frac{r}{R} + \sum_{l=1}^{n-1} \beta_l$$

The first term represents the phase offsets across the r samples of the current bit, while the summand accumulates the phase offset due to all the received bits that precede the current bit.

Joint Frequency and Modulation Index Estimation

The joint estimator 34 implements a method to perform joint modulation index and frequency offset estimation on a known transmitted FSK signal (e.g. a predetermined preamble portion of a data packet), using phase unwrapping and a nearest-point lattice algorithm.

Several variant embodiments are described below, some of which use suboptimal but lower-complexity variations of the main algorithm.

Phase-Domain Representation of System Model

The algorithms described below are implemented in the phase domain within the joint estimator 34.

Define $z_{nR+r}$ as a version of the transmitted signal in equation (1) with the nominal expected modulation index $h_0$:

$$z_{nR+r} = z_{nR} \exp\left\{ j\pi h_0 \beta_n \frac{r}{R} \right\} \quad (4)$$

$$= \sqrt{P_x} \exp\left\{ j\pi h_0 \left( \beta_k \frac{r}{R} + \sum_{l=1}^{n-1} \beta_l \right) \right\} \quad (5)$$

For a fixed preamble portion, the values of $z_{nR+r}$ are constants that are known in advance of receiving the data packet.

Considering the phases of the system model in eq. (3), it can be seen that $$\angle y_k = [\angle x_k + \theta + 2\pi\delta_f + \eta_k]_{mod\ 2\pi} \quad (6)$$

where:
- ∠ denotes the angle of the complex argument;
- $[.]_{mod\ 2\pi}$ is a modulo operation with the range [0; 2π);
- $\delta_t \triangleq \Delta_f / R$ represents a frequency offset error at the receiver, which it is desired to estimate; and
- $\eta_k$ is a noise term due to applying the angle operation to the received signal affected by $v_{nR+r}$.

Now, define $\gamma_k = \angle y_k z_k^*/(2\pi)$, and $\phi = \theta/(2\pi)$

It follows that $$\gamma_k = \left[\delta_h s_k + \phi + \delta_f \frac{k}{R} + \eta_k\right]_{mod\,1} \quad (7)$$

where on $\delta_h \triangleq h - h_0$ represents a modulation index error at the receiver, which it is desired to estimate.

Note that the $s_k$ are predetermined, corresponding to the fixed preamble portion as transmitted by the transmitter 1, whereas the $\gamma_k$ can be determined from the complex I & Q samples, $y_k$, by a correlator in the joint estimator 34, which cross-correlates the received samples, $y_k$, with stored coefficients representative of the transmitted preamble, $z_k$. If the joint estimator 34 receives timing information from the preamble correlator 33, it may not need to perform a sliding cross-correlation operation, but may instead just perform a vector dot product operation since the samples are already aligned.

In vector form, collating N symbols (and therefore n=NR samples):

$$\gamma = [\delta_h s + \phi 1 + \delta_f n + \eta]_{mod\,1} \quad (8)$$

where $\gamma = [\gamma_1\ \gamma_2\ \ldots\ \gamma_{NR}]'$,
$s = [s_1\ s_2\ \ldots\ s_{NR}]'$,
1 is the column vector of all ones,
$n = [1\ 2\ \ldots\ NR]'$, and
$\eta = [\eta_1\ \eta_2\ \ldots\ \eta_{NR}]'$.

Connection to Closest Lattice Point Search

The joint estimator 34 is designed to find estimates for the unknown parameters $\delta_h$, $\delta_f$ and $\theta$ using a least squares approach, based on the incoming I & Q samples of a preamble portion of the data packets.

Note that the effect of the modulo operation implies that there exists an integer vector $a \in \mathbb{Z}Z$ such that:

$$\gamma = \delta_h s + \phi 1 + \delta_f n + \eta - a \quad (9)$$

where the elements of a represent the numbers of times the phase has wrapped.

In fact, a vector $a \in Z$ can be chosen that minimizes the least-squares distance on the unit circle between $\gamma$ and the noise-free signal, i.e. that minimizes the cost function $$\Lambda(\gamma\,|\,\phi, \delta_h, \delta_f, a) \triangleq \min_{\delta_h \in R}\min_{\delta_f \in R}\min_{\phi \in [0,1)}\min_{a \in \mathbb{Z}^N}\|\delta_h s + (\phi 1 + \delta_f n - (\gamma + a)\|^2 \quad (10)$$

A minimization over $a \in \mathbb{Z}^N$ determines the optimal phase unwrapping. For simplicity the metric will hereafter be denoted simply as:

$\Lambda \triangleq \Lambda(\gamma|\phi, \delta_h, \delta_f, a)$.

The metric $\Lambda$ can be thought of as a type of suboptimal log-likelihood function. The vector of parameters can be denoted as:

$$M = [s\ 1\ n] \quad (11)$$

The metric $\Lambda$ then becomes $$\Lambda \triangleq \min_{\delta_h \in R}\min_{\delta_f \in R}\min_{\phi \in [0,1)}\min_{a \in \mathbb{Z}^N}\|M[\delta_h \phi \delta_f]' - (\gamma + a)\|^2 \quad (12)$$

where [.]' denotes matrix transpose.

The optimization problem then becomes to minimize the cost function:

$$\Lambda = \min_{\delta_h \in R}\min_{\delta_f \in R}\min_{\phi \in [0,1)}\min_{a \in \mathbb{Z}^N}\|(M(M'M)^{-1}M' - I)(\gamma + a)\|^2 \quad (13)$$

where I is the identity matrix of dimension NR.

Once the joint estimator 34 has found a solution â to eq. (13), it uses this to compute the unknown parameters according to:

$$[\hat{\delta}_h\ \hat{\phi}\ \hat{\delta}_f]' = (M'M)^{-1}M'(\gamma + \hat{a}) \quad (14)$$

In embodiments in which the data used for the joint estimation is known in advance of receiving the data packet—e.g. being a fixed preamble or sync word—the matrix $M(M^TM)^{-1}M^T$ can be calculated before packet reception and stored in a memory for reuse across multiple data packets.

The search for a is implemented in the joint estimator 34 using an algorithm for searching for a closest lattice point.

A lattice can be defined as a grid of points that have been generated by applying a transform to the integer grid. Here the transform is specified by a generator matrix. In the general case the nearest lattice point problem can be solved using sphere-decoding and is of complexity $O(2^N)$. Algorithms are known in the context of multiple-input multiple-output (MIMO) decoding and precoding, where the generator matrix generally has random elements resulting in high complexity. Such algorithms could be used in embodiments of the joint estimator 34, but most of these algorithms require some matrix computations, e.g. inverses and reductions, which it may be desirable to avoid using here in the interests of complexity and numerical stability.

Instead, the joint estimator 34 may solve a simplified problem, in which the dependence on the phase is removed, and in which the problem is changed from an N-dimensional "square" grid search to an N-dimensional "hexagonal" grid search.

The paper "Frequency Estimation by Phase Unwrapping" by McKilliam et al., IEEE Transactions on Signal Processing, vol. 58, no. 6, pp. 2953-2963, 2010 describes a nearest lattice-point search over a lattice $A_n^*$.

A general introduction to the $A_n^*$ lattice can be found in, for example, "Fast Quantizing and Decoding Algorithms for Lattice Quantizers and Codes" by Conway & Sloane, IEEE Transactions on Information Theory, vol. 28, no. 2, pp. 227-232, 1982.

The joint estimator 34 may implement an algorithm based on methods disclosed in the McKilliam paper. The Mckilliam algorithm has complexity of only O(N) so it can be implemented efficiently compared with generic-case algorithms.

However, in some embodiments, the joint estimator 34 may implement one or more optimizations, described below, which may trade off optimal performance for reduced complexity.

The dependence on the unknown channel phase $\varphi$ can be removed by differentiating $\Lambda(\gamma|\varphi, \delta_h, \delta_f, a)$ with respect to $\varphi$, to obtain the estimate $\hat{\varphi}$, assuming the other unknown parameters have been estimated:

$$\hat{\phi} = \frac{1'(\gamma + a - \hat{\delta}_h s - \hat{\delta}_f n)}{1'1} \quad (15)$$

Substituting this back into eq. (10) gives $$\Lambda = \min_{\delta_h \in R} \min_{\delta_f \in R} \min_{\tilde{a} \in \mathbb{Z}^N} \|\delta_h \tilde{s} + \delta_f \tilde{n} - (-\tilde{\gamma} + \tilde{a})\|^2 \quad (16)$$

where $$\tilde{\gamma} \triangleq \gamma - \frac{11'}{NR}\gamma = Q_{\bar{\phi}}\gamma \quad (17)$$

$$Q_{\bar{\phi}} \triangleq I - \frac{11'}{NR}$$

can be considered as a phase-removal transformation. The matrix $Q_{\bar{\phi}}$ also projects vectors onto the hyperplane where the sum of all elements are zero. The 'phase-free' vectors $\tilde{s}$, $\tilde{n}$ and $\tilde{a}$ are defined similarly:

$$\tilde{s} \triangleq s - \frac{11'}{NR}s = Q_{\bar{\phi}}s \quad (18)$$

$$\tilde{n} \triangleq n - \frac{11'}{NR}n = Q_{\bar{\phi}}n \quad (19)$$

$$\tilde{a} \triangleq a - \frac{11'}{NR}a = Q_{\bar{\phi}}a \quad (20)$$

$Q_{\bar{\phi}}$ is a generator matrix for the well-studied lattice $A_n^*$, which is a regular set on points in $\mathbb{R}^n$. A lattice with generator matrix G is defined as the set of points Gz where z has integer values. The lattice $A_n^*$ can be defined in terms of the lattice $A_n$, which consists of all vectors of integers in $\mathbb{Z}_{n+1}$ whose elements sum to zero. The lattice $A_n^*$ consists of $A_n$, as well as an extra n+1 versions of this set of points, each offset by a different glue vector:

$$[g] = \frac{1}{n+1}\left[\underbrace{-g, \ldots, -g}_{n+1-g \text{ times}}, \underbrace{n+1-g, \ldots, n+1-g}_{g \text{ times}}\right] \quad (21)$$

where $g \in \{0, 1, \ldots, n\}$. The lattices $A_2^*$, $A_2$ are two-dimensional hexagonal grids lying on the plane in three dimensions where the sum of all elements are zero.

Therefore the problem can be rewritten as $$\Lambda = \min_{\delta_h \in R} \min_{\delta_f \in R} \min_{\tilde{a} \in A_{NR-1}^*} \|\delta_h \tilde{s} + \delta_f \tilde{n} - (\tilde{\gamma} + -\tilde{a})\|^2 \quad (22)$$

If $\delta_h$, $\delta_f$ are known then a can be solved using an algorithm for finding the closest lattice point to $\delta_h \tilde{s} + \delta_f \tilde{n} - \tilde{\gamma}$.

Closest Lattice Point Algorithm

Approaches to solving this lattice point search in O(N) complexity are known—see, for example, "A linear-time nearest point algorithm for the lattice $A_n^*$" by Mckilliam et al., ISITA, International Symposium on Information Theory and Its Applications, IEEE, pp. 1-5, 2008, Given some initial estimates of $\delta_h$ and $\delta_f$, the joint estimator 34 can use such an approach to perform a lattice point search.

This algorithm makes use of a theorem which is described in "An Algorithm to Compute a Nearest Point in the Lattice $A_n^*$" by Vaughan & Clarkson, Applied Algebra, Algebraic Algorithms and Error-Correcting Codes, Springer, 1999, pp. 104-120, and which is used below when describing a lower complexity variant.

Clarkson's Theorem:
Define $$p(\gamma) = -Q_{\bar{\phi}}\lfloor\gamma\rceil \quad (23)$$

Then the nearest lattice point in $A_{N-1}^*$ to $\gamma$ is p or p+r where r is a relevant vector.

A relevant vector $r \in A_{N-1}^*$ is a lattice point whose polyhedral Voronoi region (i.e. nearest neighbour region) shares a face with the Voronoi region of the point at the origin, 0. That is, r is a neighbour to 0.

The algorithm first proceeds by taking $\lceil\gamma\rfloor$ as an initial estimate and then sorting the vector of associated rounding errors i.e. $\lceil\gamma\rfloor-\gamma$. The sorting operation is used to successively increment the individual elements of $\lceil\gamma\rfloor$ in a specific order so as to iterate through all the relevant vectors when calculating the metrics. Because the elements being sorted are the indices 1, ..., N, a bucket sort can be employed which has a complexity of only O(N) compared to a sorting algorithm for generic elements which has a complexity of no less than O(N log N). In addition, apart from the initialization, vector operations are avoided.

Implementations

The algorithm implemented by the joint estimator 34 can be divided into two steps:

step 1: a nearest lattice point search to obtain $\tilde{a}$; and
step 2: back-substitution in order to obtain $\delta_h$ and $\delta_f$.

Various different implementations of step 1 are possible, including:

algorithm 1a: a grid search over the tuple $(\delta_h, \delta_f)$, over a sensible range;
algorithm 1b: a single grid point search over the tuple $(\delta_h, \delta_f)=(0, 0)$; and
algorithm 1c: assume $\delta_h=0$ and obtain a first estimate of $\delta_f$.

Additionally, various different implementations of step 2 are possible, including:

algorithm 2a: grid search;
algorithm 2b: full back-substitution; and
algorithm 2c: inverse-free back-substitution.

These different algorithms will now be described in more detail.

Algorithm 1a: Grid Search

This algorithm uses one or more trial tuples of $(\delta_h, \delta_f)$. Note that $\delta_h$ and $\delta_f$ are, for practical reasons, typically restricted to a predetermined range—for example, due to requirements imposed by a radio communication standard, or the bandwidth of the analog receiver. In some embodiments, these tuples may be drawn from regular points restricted to a specific range, e.g. a square or hexagonal grid. For each trial tuple, a respective lattice point search is performed—e.g. using the McKilliam algorithm mentioned above—and the value of $\Lambda$ with the minimizing lattice point $\tilde{a}$ is obtained.

Algorithm 1b: Single Grid Point Search

A variant that may be useful when receiving signals for which the deviation from the expected values of $\hat{o}n$ and $\delta_f$ will be relatively small—e.g. when receiving BLE signals. The BLE specification requires that $|\delta_h|<0.05$, while the use of clock sources with accuracy of $\leq 50$ ppm results in a maximum offset between transmitter and receiver of 2×50 ppm×2.48e9=248 KHz, such that $|\delta_f|<248\text{e}3/1\text{e}6=0.248$.

Thus, in some embodiments, the joint estimator 34 performs only a single lattice point search using $(\delta_h, \delta_f)=(0, 0)$ as an initial estimate.

Algorithm 1c: Suboptimal $A_{N-1}^*$ Lattice Search

In another variant, instead of performing a search over multiple $(\delta_h, \delta_f)$, the joint estimator 34 instead sets $\delta_h=0$ and first performs a frequency correction on the incoming data using a low-complexity coarse frequency estimator. One embodiment uses a Meyr D-spaced estimator, using only N=4 symbols with a spacing of D=1, as described on page 488 of "Digital Communication Receivers: Synchronization and Channel Estimation Algorithms" by Meyr et al., ISBN 0-471-50275-8, John Wiley & Sons, 1998. The residual $\delta_f$ is typically small. After obtaining a coarse frequency estimate and rotating the incoming samples accordingly, the lattice search is then performed on the compensated samples using initial values of $\delta_h=\delta_f=0$, similarly to algorithm 1b.

For all these approaches, once the lattice search is complete, $Q_{\overline{\omega}}\gamma$ is then used as the estimate of $\tilde{a}$.

Simulations have shown that, if the signal-to-noise ratio is sufficiently high, and N, $\delta_h$, $\delta_f$ are sufficiently small, and the phase rotation is supplied, then $\tilde{a}$ is usually given by $Q_{\overline{\omega}}\lceil \gamma \rfloor$. (Note that Clarkson's Theorem implies that if $p(\gamma)$ is not the optimal solution, then p+g will be, for some glue vector g).

Algorithm 2a: Grid Search

When using algorithm 1a, the values of $\hat{\delta}_h$ and $\hat{\delta}_f$ in the grid which minimize the value of $\wedge$ can be identified and provided as the estimates. This is not useful if only a single grid point is used (algorithms 1b and 1c). If searching over $(\delta_h, \delta_f)$ and also solving for lattice point $\tilde{a}$, the tuple $(\delta_h, \delta_f, \tilde{a})$ that minimizes the metric is identified.

Algorithm 2b: Full Back-Substitution

In some embodiments, the value of a that minimizes the value of A is back-substituted into eq. (14), enabling new estimates of $\varphi_h$, $\hat{\delta}_h$ and $\hat{\delta}_f$ to be obtained.

Alternatively, by defining $\tilde{M}=[\tilde{s}\ \tilde{n}]$ and following similar steps to obtaining eq. (14), the joint estimator 34 may determine $$[\hat{\delta}_h\ \hat{\delta}_f]'=(\tilde{M}'\tilde{M})^{-1}\tilde{M}'(\tilde{\gamma}+\tilde{a}) \quad (24)$$

Algorithm 2c: Inverse-Free Back-Substitution

An alternative way to obtain the solution in eq. (24) while avoiding the need for the inverse operation is to obtain the phase-free and frequency-free estimates by further differentiating $\wedge$ with respect to $\delta_h$ and solving:

$$\tilde{\gamma}_h = \tilde{\gamma} - \frac{\tilde{n}'\tilde{\gamma}}{\tilde{n}'\tilde{n}}\tilde{n} \quad (25)$$

$$\tilde{s}_h = \tilde{s} - \frac{\tilde{n}'\tilde{s}}{\tilde{n}'\tilde{n}}\tilde{n} \quad (26)$$

The modulation index offset estimate is then $$\delta_h = \frac{\tilde{s}'_h \tilde{\gamma}_h}{\tilde{s}'_h \tilde{s}_h} \quad (27)$$

The joint estimator 34 can then obtain the modulation index-free and frequency-free estimates by further differentiating $\wedge$ with respect to $\delta_f$ and solving:

$$\tilde{\gamma}_f = \tilde{\gamma} - \frac{\tilde{s}'\tilde{\gamma}}{\tilde{s}'\tilde{s}}\tilde{s} \quad (28)$$

$$\tilde{n}_f = \tilde{s} - \frac{\tilde{s}'\tilde{n}}{\tilde{s}'\tilde{s}}\tilde{s} \quad (29)$$

The frequency offset estimate is then $$\delta_f = \frac{\tilde{n}'_h \tilde{\gamma}_h}{\tilde{n}'_h \tilde{n}_h} \quad (30)$$

Note that many of the terms in this equation can be calculated in advance of receiving a data packet, and may be stored in a memory accessible to the joint estimator 34. In particular, the term n'n in eq. (25), the entirety of eq. (26), the term s's in eq. (28), and the entirety of eq. (29), may be precomputed. This could be done by the receiver 15, or on a computer away from the receiver 15 with the results being loaded onto the receiver 15.

Pseudocode

The following exemplary pseudocode implements algorithms 1b and 1c. In both cases algorithm 2b is employed for step 2.

// Closest Lattice Point Search
if Algorithm1b
 gammapf=gamma−ones(N*R,1)(N*R)*sum(gamma);
 apf=clpAnStar(deltah*spf+deltaf*npf−gammapf, length=N*R−1);
elseif Algorithm 1c
 gamma=gamma−deltafest*(1:N*R)/R;  // Apply frequency correction from Meyr estimator
 gammapf=gamma−ones(N*R,1)(N*R)*sum(gamma);
 wpfr=round(−gammapf);
 apf=wpfr−(sum(wpfr))/(N*R)*ones(N*R,1);
end
ypf=gammapf+apf;
// Backsubstitution
ypff=ypf−npf*(npf'*ypf)/(npf'*npf);
spff=spf−npf*(npf'*spf)/(npf'*npf);
hest=spff'*ypff/(spff'*spff);  // Modulation index offset estimate
yphf=ypf−spf*(spf'*ypf)/(spf'*spf);
nphf=npf−spf*(spf'*npf)/(spf'*spf);
fest=nphf'*yphf/(nphf'*nphf);  // Frequency offset index estimate The joint estimator 34 may comprise hardware logic which implements some or all of the steps represented in this pseudocode, or similar steps for any of the other algorithms or variants thereof. In other embodiments, the joint estimator 34 may be implemented at least partly by software executing on a processor—e.g. the processor 21.

Simulation Results

Simulation results are provided in the table below. These simulate receiving FSK signals with a symbol rate of 1 MSymbols/s, and a transmitted modulation index, $h_{TX}=0.45$ or 0.5. The nominal carrier frequency is assumed to be 2.5 GHZ. The nominal receiver modulation index, $h_{RX}$, is 0.5 for the Meyr D-spaced estimator. The maximum frequency offset between transmitter and receiver is defined in parts per million (ppm), and is simulated over a uniform distribution of +/−50 ppm or +/−150 ppm. The resulting offset in Hz can be calculated by multiplying the ppm figures by $2.5\times10^9\times10^{-6}$. The SNR is 15 dB. Timing synchronization is assumed (i.e. genie timing sync).

Simulations are shown for search algorithm 1b (single point) and algorithm 1c (Meyr D-spaced estimator), both employing the back-substitution algorithm 2b. These are denoted "Lattice+Back" and "Meyr N=4, D=1, Round+back, N=16" respectively.

Frequency offset estimates obtained directly from a D=1 spaced Meyr estimator of length N=4, and from a D=2 spaced Meyr estimator of length N=16, are also shown for comparison purposes.

|  | Meyr N = 4, D = 1 | Meyr N = 16, D = 2 | Alg. 1b Lattice + Back, N = 16 | Alg. 1c Meyr N = 4, D = 1, Round + back, N = 16 | Meyr N = 4, D = 1 | Meyr N = 16, D = 2 | Alg. 1b Lattice + Back, N = 16 | Alg. 1c Meyr N = 4, D = 1, Round + back, N = 16 |
|---|---|---|---|---|---|---|---|---|
| | | | | $h_{TX} = 0.5$ | | | | |
| Max offset | 50 ppm | | | | 150 ppm | | | |
| sqrt(($f_0 - f_{est}$)^2) [ppm] | 21.4 | 4.46 | 5.85 | 7.27 | 21.8 | 720 | 5.75 | 7.64 |
| sqrt(($h_{TX} - h_{est}$)^2) [ppm] | | | 0.0137 | 0.0149 | | | 0.0128 | 0.0142 |
| | | | | $h_{TX} = 0.45$ | | | | |
| Max offset | 50 ppm | | | | 150 ppm | | | |
| sqrt(($f_0 - f_{est}$)^2) [ppm] | 35.3 | 16.1 | 5.86 | 11.6 | 36.2 | 711 | 5.8 | 9.42 |
| sqrt(($h_{TX} - h_{est}$)^2) [ppm] | | | 0.0137 | 0.0196 | | | 0.0137 | 0.0185 |

It can be seen that the algorithms 1b and 1c both results in a slightly worse estimate, fest, of the true frequency offset, $f_0$, than Meyr N=16 at 50 ppm offset ("5.85" and "7.27" vs "4.46") when there is no modulation index offset—i.e. when $h_{TX}=0.5$. However, when there is a modulation index offset, both algorithms produce significantly better frequency estimates at 50 ppm ("5.86" and "11.6" vs "16.1").

Algorithm 1b outperforms algorithm 1c for all scenarios. This is expected since algorithm 1c is a suboptimal lower complexity variation of algorithm 1b. Note also that when the maximum frequency offset increases to 150 ppm, algorithms 1b and 1c still provide accurate estimates, and algorithm 1c does not underperform algorithm 1b by much, whereas Meyr's D=2 spaced estimator fails. This is because Meyr's algorithm can only provide an estimate within a specific tuning range which reduces as D increases.

Although some of the above disclosure has been described in the context of binary symbols (i.e. bits), it will be appreciated that the same principles can also be applied to systems that use higher-order modulation, such as quadrature modulation, where each symbol may have four or more possible values.

Although some of the above disclosure has been described in the context of frequency-modulated signals, it will be appreciated that the same underlying principles can also be applied to phase-modulated signals, especially signals that maintain an amplitude within a limited range such that their phase does not traverse the unit circle. In this case, the joint frequency-offset and modulation-index estimator will consider only the phase of the received data.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An apparatus for demodulating a frequency-modulated signal, the apparatus comprising:
   a joint frequency-offset and modulation-index estimator; and
   a signal demodulator,
   wherein the joint frequency-offset and modulation-index estimator is configured to:
   receive data representative of a preamble portion of the frequency-modulated signal, wherein the preamble portion is modulated with predetermined preamble data; and
   jointly determining a frequency-offset estimate and a modulation-index estimate by using the received data to perform an optimization process, wherein the optimization process minimizes a cost function that is a function of the received data and that is parameterised by a frequency-offset parameter and by a modulation-index parameter,
   and wherein the signal demodulator is configured to:
   receive data representative of a message portion of the frequency-modulated signal, wherein the message portion is modulated with message data; and
   use the frequency-offset estimate to demodulate the message.

2. The apparatus of claim 1, wherein the signal demodulator is configured to use the modulation-index estimate, as well as the frequency-offset estimate, when demodulating the message portion.

3. The apparatus of claim 1, wherein the data representative of the preamble portion comprise a sequence of complex sample values, and wherein the joint frequency-offset and modulation-index estimator is configured to calculate a phase angle for each of the complex sample values, for performing the optimization process in a phase domain.

4. The apparatus of claim 1, wherein the cost function is a least-squares cost function.

5. The apparatus of claim 1, configured to store or access stored data relating to the predetermined preamble data, wherein the cost function is a function of both the stored data and the received data, and wherein the joint frequency-offset and modulation-index estimator is configured to use the stored data when performing the optimization process.

6. The apparatus of claim 5, wherein the stored data represents a sequence, or a function of a sequence, of accumulated phase offsets for a signal modulated with the predetermined preamble data.

7. The apparatus of claim 5, wherein the stored data encodes a matrix that is a function of one or more matrices, wherein at least one of the matrices has a row or column containing a series of accumulated phase-offset values that are dependent on the predetermined preamble data.

8. The apparatus of claim 1, wherein the cost function is further parameterised by a phase-unwrapping parameter and wherein the joint frequency-offset and modulation-index estimator is configured to minimize the cost function over the phase-unwrapping parameter.

9. The apparatus of claim 8, wherein the joint frequency-offset and modulation-index estimator is configured to keep the frequency-offset parameter constant when performing the optimization process, and is further configured to determine the frequency-offset estimate by back-substitution after determining an optimal value for the phase-unwrapping parameter using the optimization process.

10. The apparatus of claim 9, wherein the joint frequency-offset and modulation-index estimator comprises a frequency estimator configured to determine a first estimate of the frequency offset; and is configured to perform the optimization process with the frequency-offset parameter set to the first estimate, or is configured to use the first estimate to apply frequency-offset compensation to the data representative of the preamble portion and to perform the optimization process with the frequency-offset parameter set to zero.

11. The apparatus of claim 8, wherein the joint frequency-offset and modulation-index estimator is configured to keep the modulation-index parameter constant during the optimization process, and is further configured to determine the modulation-index estimate by back-substitution after determining an optimal value for the phase-unwrapping parameter.

12. The apparatus of claim 1, wherein the joint frequency-offset and modulation-index estimator is configured to determine the frequency-offset estimate and the modulation-index estimate by performing the optimization process a plurality of times, with the frequency-offset parameter and the modulation-index parameter set to a different pair of constant values each time, and to determine a pair of the pairs of constant values that resulted in a lowest minimum cost for the cost function.

13. The apparatus of claim 1, wherein the joint frequency-offset and modulation-index estimator is configured to minimize the cost function by performing a closest-lattice-point search to identify a closest point in a lattice.

14. The apparatus of claim 13, wherein the joint frequency-offset and modulation-index estimator is configured to search for a closest point over the lattice $A_n^*$, for an integer n, using an algorithm having O(N) complexity.

15. The apparatus of claim 1, wherein the frequency-modulated signal is a radio signal and wherein the apparatus comprises a radio receiver for receiving the modulated radio signal and for generating the data representative of the preamble and message portions.

16. The apparatus of claim 1, wherein the frequency-modulated signal is a Gaussian frequency-shift-key (GFSK) modulated signal.

17. The apparatus of claim 1, wherein the frequency-modulated signal is modulated with constant amplitude.

18. A method of demodulating a frequency-modulated signal, the method comprising:
  receiving data representative of a preamble portion of the frequency-modulated signal, wherein the preamble portion is modulated with predetermined preamble data;
  jointly determining a frequency-offset estimate and a modulation-index estimate by using the received data to perform an optimization process, wherein the optimization process minimizes a cost function that is a function of the received data and that is parameterised by a frequency-offset parameter and by a modulation-index parameter;
  receiving data representative of a message portion of the frequency-modulated signal, wherein the message portion is modulated with message data; and
  using the frequency-offset estimate when demodulating the message portion.

19. The method of claim 18, wherein the frequency-modulated signal is a Gaussian frequency-shift-key (GFSK) modulated signal.

20. The method of claim 18, wherein the frequency-modulated signal is modulated with constant amplitude.

* * * * *